United States Patent Office 3,434,990
Patented Mar. 25, 1969

3,434,990
ACCELERATING THE CURE RATE OF CARBOXYLATED POLYBUTADIENE-AZIRIDINYL COMPOUND MIXTURES WITH LITHIUM OLEATE
Arnold Adicoff and Arnold A. Yukelson, China Lake, Calif., assignors to the United States of America as represented by the Secretary of the Navy
No Drawing. Filed May 13, 1966, Ser. No. 551,179
Int. Cl. C08f 21/00
U.S. Cl. 260—23.7     4 Claims

ABSTRACT OF THE DISCLOSURE

Lithium oleate is used to increase the cure rate of carboxylated polybutadiene by aziridinyl compounds.

The invention herein described may be manufactured and used by or for the Government of the United States of America for governmental purposes without the payment of any royalties thereon or therefor.

The invention relates to a process for accelerating the rate of cure of polymeric materials; more specifically, it is a method of polymerizing carboxylic acid polymers such as the carboxylic acid terminated polybutadiene with aziridinyl compounds using lithium oleate as a catalyst.

In recent years a great deal of research work has been directed toward improving the curing rate of many polymeric materials, patricularly the unsaturated rubbery polymers which require a curing or crosslinking treatment to place them in a useful condition or to extent their scope of usefulness. Great advances have been made in this field as a result of the discovery of new catalyst systems. In the present invention lithium oleate added in small amounts to a mixture of carboxylic acid containing polybutadiene and an aziridinyl crosslinking agent shortens the time required to cure the material at any given temperature.

It is therefore an object of the present invention to provide a method for producing a cured polymeric product in about one-half the time of other known methods.

Another object is to produce more quickly and economically a polymeric binder material for use in a propellant system.

Yet another object is to provide prepolymers with short cure times at various temperatures.

Other objects and many of the attendant advantages of this invention will be readily appreciated as the same become better understood by reference to the detailed description.

In accordance with the present invention a small amount of lithium oleate (0.5 to 1.0%) was blended at room temperature into a mixture comprising a 1:1 functional ratio of a carboxylated polybutadiene and an aziridinyl type crosslinking agent. The time to gelation was considerably reduced at various temperatures.

Experiments were performed and time of gelation recorded of four batches of a 1:1 functional ratio of carboxy terminated polybutadiene (Butarez CTL Type II) and the crosslinking agent, tris[1-(2-methyl) aziridinyl] phosphine oxide (MAPO). The results are set out in Table I below.

TABLE I.—TIME TO GELATION IN MINUTES

| Butarez CTL II and MAPO | 90° C. | 80° C. | 70° C. | 60° C. | 50° C. |
|---|---|---|---|---|---|
| Batch 1 | 120 | 202 | 370 | 650 | -------- |
| Batch 2 | 114 | 199 | 333 | 630 | 1,250 |
| Batch 3 | 122 | 197 | 344 | 640 | -------- |
| Batch 4 | 104 | 201 | 330 | 660 | -------- |
| Average | 115 | 200 | 344 | 645 | 1,250 |

In contrast experiments set out in Table II below show the time to gelation for a 1:1 functional ratio of carboxy terminated polybutadiene, designated Butarez CTL II, and tris[1-(2-methyl) aziridinyl]phosphine oxide, designated MAPO, to which 0.5% and 1.0% lithium oleate (LO) was added.

TABLE II.—TIME TO GELATION IN MINUTES

| Composition | 90° C. | 80° C. | 70° C. | 60° C. | 50° C. |
|---|---|---|---|---|---|
| Butarez CTL II and MAPO | 115 | 200 | 344 | 645 | 1,250 |
| Butarez CTL II, MAPO and 0.5% LO | 73 | 146 | 272 | 519 | 1,035 |
| Butarez CTL II, MAPO and 1.0% LO | 42 | 81 | 164 | 339 | 724 |

It is apparent from Table II that the addition of a catalytic quantity of lithium oleate to the carboxylated polybutadiene-prepolymeraziridinyl system shortens the time required to polymerize the material at any given temperature.

The prepolymer used is a carboxy terminated polybutadiene sold under the tradename Butarez CTL Type II and the aziridinyl type crosslinking agents was tris[1-(2-methyl)aziridinyl]phosphine oxide (MAPO).

In Table III below there is shown the gelation time of four batches of a 1:1 functional ratio of carboxy terminated polybutadiene (Butarez CTL Type II) and the butylene imine adduct of trimesic acid, designated HX 868 and butylene imine adduct of triazine, designated HX 874. The butylene imine adduct of trimesic acid has the formula

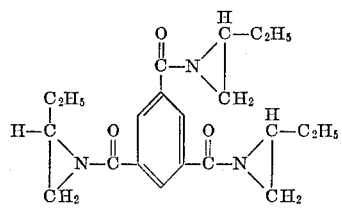

and the butylene imine adduct of triazine has the formula

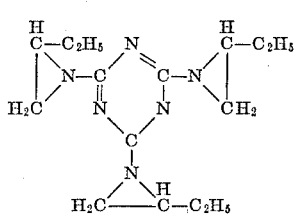

The examples show the gelation time with and without lithium oleate (LO).

Table III
(Time to gelation in minutes)

| Composition: | 74° C. |
|---|---|
| Butarez CTL II and HX 868 | 105 |
| Butarez CTL II, HX 868 and 1.0% LO | 66 |
| Butarez CTL II and HX 874 | 76 |
| Butarez CTL II, HX 874 and 0.8% LO | 50 |

It is apparent that the addition of a catalytic quantity of lithium oleate to the carboxylated-polybutadiene prepolymer-aziridinyl system decreases the time required to polymerize the material.

The catalytic amounts of lithium oleate are limited to the extent to which the lithium oleate is soluble in the system. If the solubility is exceeded and the system becomes heterogeneous other unanticipated effects upon physical properties may occur.

Obviously many modifications and variations of the present invention are possible in the light of the above teachings. It is therefore understood that within the scope of the appended claims the invention may be practiced otherwise than as specifically described.

What is claimed is:

1. A method for accelerating the cure rate of carboxylated polybutadienes which comprises: blending a catalytic amount of lithium oleate into a mixture consisting of a 1:1 functional ratio of a carboxylated polybutadiene prepolymer and an aziridinyl crosslinking agent.

2. The method of claim 1 wherein the crosslinking agent is tris[1-(2-methyl)aziridinyl]phosphine oxide.

3. The method of claim 1 wherein the crosslinking agent is the butylene imine adduct of trimesic acid.

4. The method of claim 1 wherein the crosslinking agent is the butylene imine adduct of triazine.

References Cited

UNITED STATES PATENTS

| 3,074,917 | 1/1963 | Reynolds | 260—85.1 |
| 3,097,193 | 7/1963 | Gruver | 260—85.1 |
| 3,153,639 | 10/1964 | Kraus et al. | 260—85.1 |
| 3,305,523 | 2/1967 | Burnside | 260—46.5 |
| 3,354,116 | 11/1967 | Gruver et al. | 260—41.5 |

DONALD E. CZAJA, Primary Examiner.

R. A. WHITE, Assistant Examiner.

U.S. Cl. X.R.

260—94.7